(12) United States Patent
Chida et al.

(10) Patent No.: US 10,634,489 B2
(45) Date of Patent: Apr. 28, 2020

(54) DISPLACEMENT SENSOR

(71) Applicant: Yokogawa Electric Corporation, Musashino-shi, Tokyo (JP)

(72) Inventors: Naomichi Chida, Tokyo (JP); Kazuki Setsuda, Tokyo (JP); Kazufumi Nishida, Tokyo (JP); Jun Katsuyama, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 0 days.

(21) Appl. No.: 16/127,318

(22) Filed: Sep. 11, 2018

(65) Prior Publication Data

US 2019/0078875 A1    Mar. 14, 2019

(30) Foreign Application Priority Data

Sep. 14, 2017  (JP) ................. 2017-177107

(51) Int. Cl.
*G01B 11/28* (2006.01)
*G02B 13/22* (2006.01)
*G02B 27/28* (2006.01)
*G01B 11/02* (2006.01)

(52) U.S. Cl.
CPC .......... *G01B 11/285* (2013.01); *G01B 11/026* (2013.01); *G02B 13/22* (2013.01); *G02B 27/283* (2013.01)

(58) Field of Classification Search
CPC .. G01B 11/285; G01B 11/026; G02B 27/283; G02B 13/22
See application file for complete search history.

(56) References Cited

U.S. PATENT DOCUMENTS

| 5,428,475 | A | * | 6/1995 | Tanaami | ............... | G02B 3/0056 |
| | | | | | | 359/234 |
| 5,523,844 | A | * | 6/1996 | Hasegawa | ............ | G01B 11/026 |
| | | | | | | 356/623 |
| 7,142,315 | B1 | * | 11/2006 | Lange | ................. | G01B 11/0616 |
| | | | | | | 356/632 |

(Continued)

FOREIGN PATENT DOCUMENTS

| CN | 106772923 A | 5/2017 |
| DE | 102008031412 A1 | 1/2010 |

(Continued)

*Primary Examiner* — Dominic J Bologna
(74) *Attorney, Agent, or Firm* — Sughrue Mion, PLLC (57) ABSTRACT

A displacement sensor includes a linear light source which emits a linear beam, a beam splitter, a line sensor, and an imaging lens. The linear light source is disposed with an inclination of a predetermined angle with respect to a perpendicular line of an optical axis of the imaging lens. The imaging lens forms an image of the linear light source at a position conjugate with the linear light source with an inclination of a predetermined angle with respect to the perpendicular line of the optical axis of the imaging lens. The beam splitter is disposed between the linear light source and the imaging lens. The line sensor is disposed at a position conjugate with the image formed by the imaging lens through the imaging lens and the beam splitter so that the optical axis of the imaging lens has the inclination of the predetermined angle with respect to the perpendicular line of the optical axis reflected by the beam splitter.

19 Claims, 9 Drawing Sheets

(56) References Cited

U.S. PATENT DOCUMENTS

| | | | |
|---|---|---|---|
| 2004/0129858 A1 | 7/2004 | Czarnetzki et al. | |
| 2010/0123904 A1* | 5/2010 | Yamakawa | G01B 11/02 |
| | | | 356/614 |
| 2011/0013186 A1 | 1/2011 | Miki | |
| 2011/0273557 A1* | 11/2011 | Ichizawa | G01B 11/028 |
| | | | 348/88 |
| 2015/0226544 A1* | 8/2015 | Nemoto | G01B 11/026 |
| | | | 356/612 |
| 2015/0346083 A1* | 12/2015 | Matsumoto | G01N 21/8851 |
| | | | 356/369 |
| 2019/0155172 A1* | 5/2019 | Shmarev | G01N 21/956 |

FOREIGN PATENT DOCUMENTS

| | | |
|---|---|---|
| JP | 04-313714 A | 11/1992 |
| JP | 07-234527 A | 9/1995 |
| JP | 10-048530 A | 2/1998 |
| JP | 2004-528605 A | 9/2004 |
| JP | 2011-039026 A | 2/2011 |

* cited by examiner

DISPLACEMENT SENSOR

BACKGROUND

Technical Fields

The present invention relates to a displacement sensor.

Priority is claimed on Japanese Patent Application No. 2017-177107, filed on Sep. 14, 2017, the contents of which are incorporated herein by reference.

Related Art

A confocal displacement gauge that uses axial chromatic aberration of an objective lens has been proposed. In such a confocal displacement gauge, light emitted from a white light source is guided to a sensor head through an optical fiber or an optical fiber coupler. The light emitted from an optical fiber end to a space is converted to parallel light by a collimating lens and the parallel light is focused in the vicinity of a workpiece of a measurement object by an objective lens having large chromatic aberration. The light incident on the objective lens having large chromatic aberration has different focuses at different wavelengths due to the chromatic aberration. The light having the wavelength focused on the workpiece reverses an incident path, becomes parallel light through the objective lens, and forms an image on the optical fiber end through the collimating lens. In the wavelength at this time, the position of the workpiece and the optical fiber end have a confocal relationship. Meanwhile, since reflected light of a wavelength focused at a position different from the workpiece does not become parallel light after entering the objective lens, the light does not form an image at the optical fiber end through the collimating lens. A light beam having a wavelength reflected by the workpiece forms an image at the optical fiber end, passes through the optical fiber, and is branched by an optical fiber coupler. Then, the wavelength of the light incident on and reflected by a spectroscope is determined. A distance between the workpiece and the objective lens can be measured when the wavelength reflected by the workpiece is given by previously measuring a distance at which the wavelength is in focus (for example, see Japanese Unexamined Patent Application Publication No. 2011-39026).

Additionally, a confocal system is an optical system in which light reflected from a surface of a workpiece is received by a detector and is an optical system which is designed so that illumination light radiated from a light source is focused on the surface of the workpiece and reflected light thereof is also focused on a detector.

The spectroscope which is used in such a confocal displacement gauge includes an entrance slit, a diffraction grating, and a line sensor in which light receiving elements are arranged in a row. For example, light which is introduced from the optical fiber is incident from the entrance slit of the spectroscope and is diffracted in a different direction according to each wavelength by the diffraction grating. Light diffracted by each of the diffraction grating forms an image at a position on the line sensor. When a relationship between the position of the element on the line sensor and the wavelength is measured in advance, a wavelength of reflected light can be known based on an output of the line sensor.

However, in the technique disclosed in Japanese Unexamined Patent Application Publication No. 2011-39026, the confocal displacement gauge includes the spectroscope and the objective lens having large chromatic aberration. It is desirable to design the objective lens having large chromatic aberration so that chromatic aberration linearly changes with respect to the wavelength. Since it is difficult to design the objective lens, a design cost is high as compared with a general imaging lens. Further, since a structure is different from that of the general imaging lens, a manufacturing cost is high.

Further, the spectroscope needs to secure the attachment accuracy of the entrance slit, the diffraction grating, and the line sensor, the stability of the dimension or position with respect to a temperature or humidity, and the like. Also, optical elements such as the diffraction grating are expensive and a manufacturing cost involved with assembly or adjustment is high.

In this way, the confocal displacement gauge described in Japanese Unexamined Patent Application Publication No. 2011-39026 increases in cost due to the spectroscope or the objective lens having large chromatic aberration. Further, in the technique disclosed in Japanese Unexamined Patent Application Publication No. 2011-39026, since the light source, the objective lens having large chromatic aberration, and the spectroscope detecting a wavelength are each independent from one another, there is a problem that the displacement gauge cannot be easily decreased in size.

SUMMARY

A displacement sensor which detects displacement of a measurement object, may include a linear light source which emits a linear beam, a beam splitter, a line sensor, and an imaging lens, wherein the linear light source is disposed with an inclination of a predetermined angle with respect to a perpendicular line of an optical axis of the imaging lens, wherein the imaging lens forms an image of the linear light source at a position conjugate with the linear light source with an inclination of a predetermined angle with respect to the perpendicular line of the optical axis of the imaging lens, wherein the beam splitter is disposed between the linear light source and the imaging lens, and wherein the line sensor is disposed at a position conjugate with the image formed by the imaging lens through the imaging lens and the beam splitter so that the optical axis of the imaging lens has the inclination of the predetermined angle with respect to the perpendicular line of the optical axis reflected by the beam splitter.

Further features and aspects of the present disclosure will become apparent from the following detailed description of exemplary embodiments with reference to the attached drawings.

DETAILED DESCRIPTION OF THE EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a displacement sensor which is easily decreased in cost and size while ensuring high accuracy as compared with the related art.

Hereinafter, embodiments of the present invention will be described with reference to the drawings. In the drawings used for the following description, the scale of each member is appropriately changed in order for each member to have a recognizable size.

First Embodiment

Figure 1:
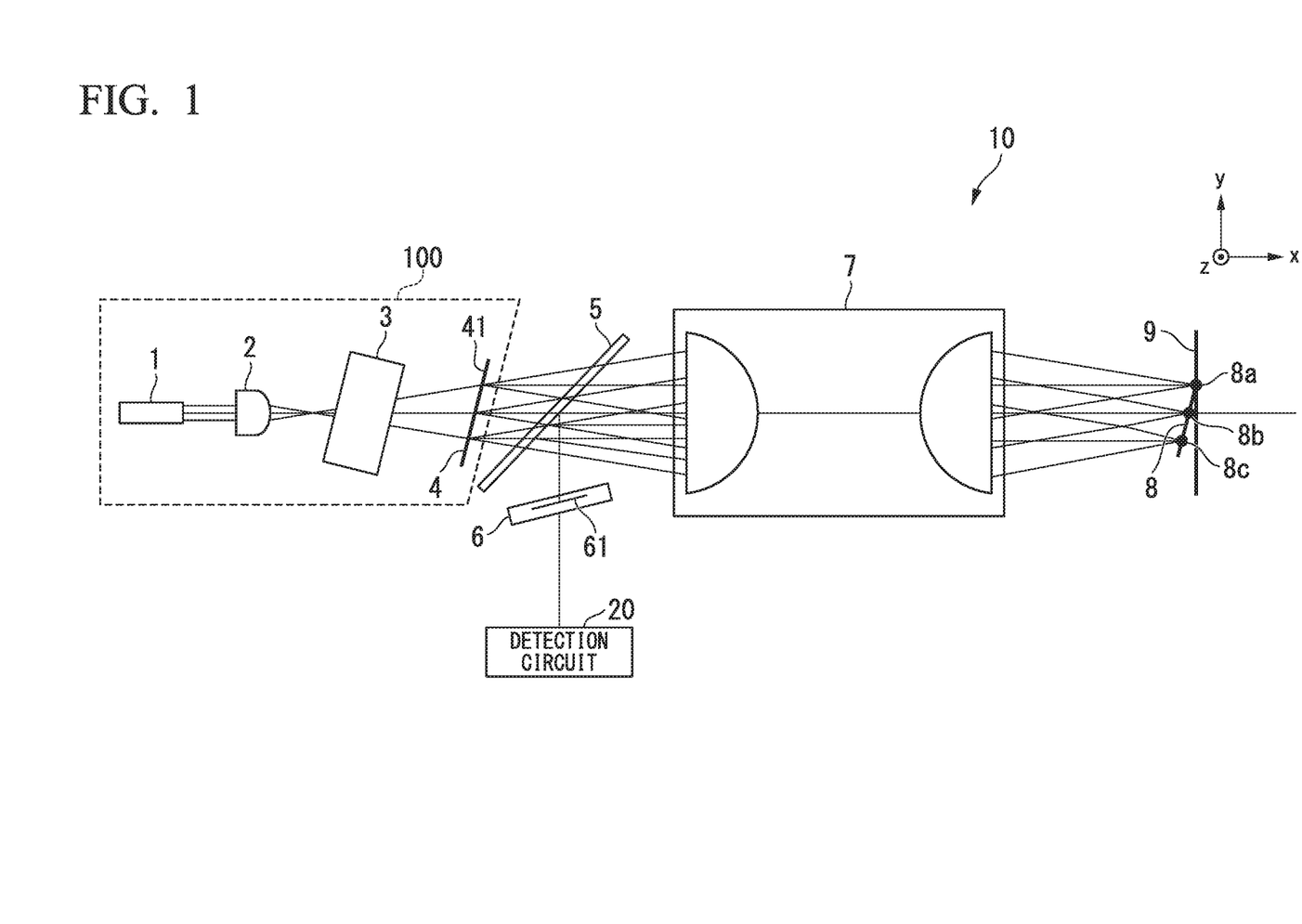
FIG. 1 is a diagram showing a configuration example of a displacement sensor according to a first embodiment and is a diagram as viewed from a + side of a z axis.
Figure 2:
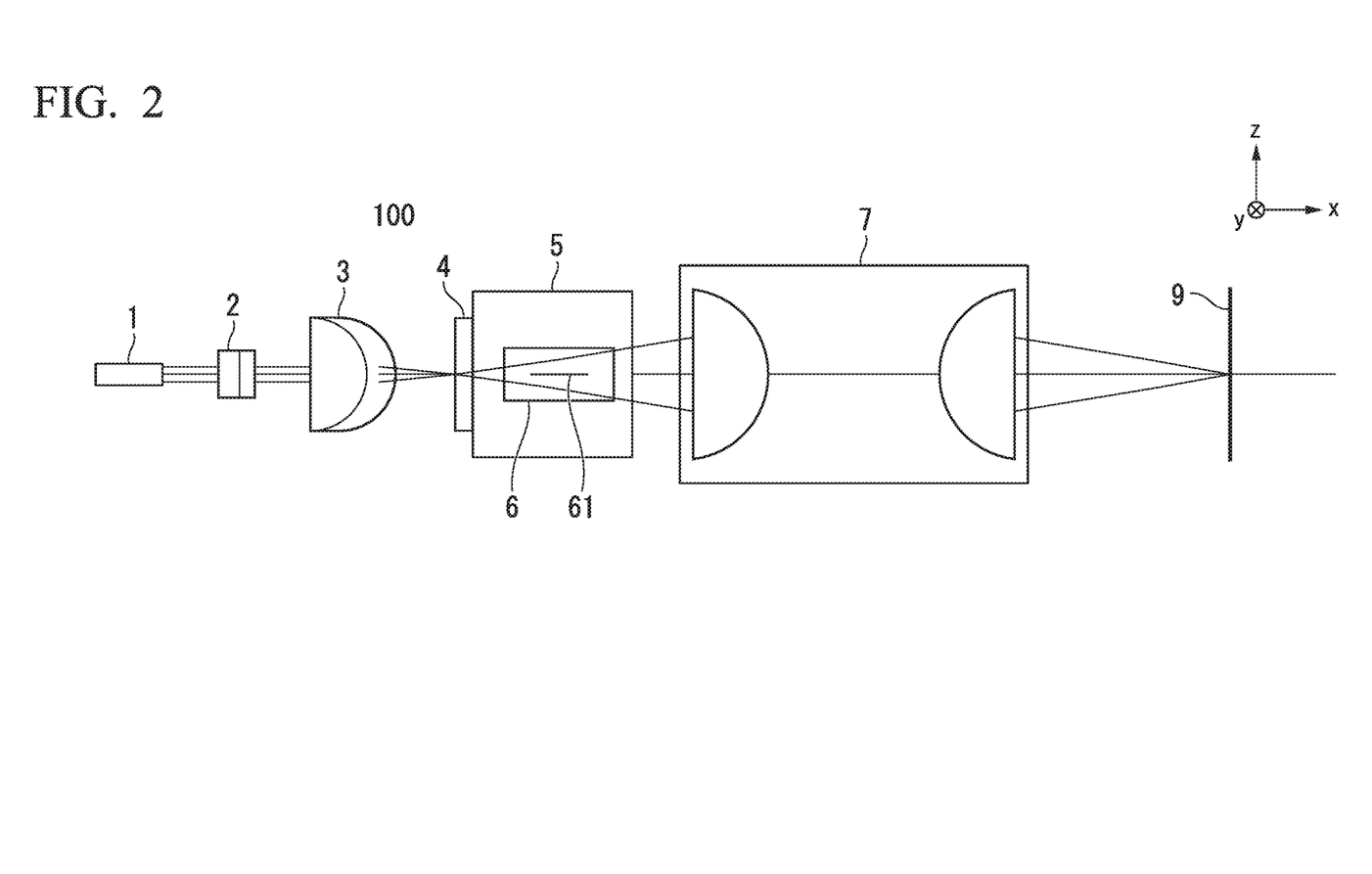
FIG. 2 is a diagram showing a configuration example of the displacement sensor according to the first embodiment and is a diagram as viewed from a + side of a y axis.

FIG. 1 is a diagram showing a configuration example of a displacement sensor 10 according to the embodiment and is a diagram as viewed from the + side of the z axis. Additionally, reflected light is omitted in FIG. 1. FIG. 2 is a diagram showing a configuration example of the displacement sensor according to the embodiment and is a diagram as viewed from the − side of the y axis.

As shown in FIGS. 1 and 2, the displacement sensor 10 includes a light source 1, a first cylindrical lens 2, a second cylindrical lens 3, a slit 4, a beam splitter 5, a line sensor 6, an imaging lens 7, and a detection circuit 20. Further, the line sensor 6 includes a line sensor element 61. The reference numeral 9 indicates a measurement object (workpiece).

Additionally, in the embodiment, the light source 1, the first cylindrical lens 2, the second cylindrical lens 3, and the slit 4 will be referred to as a linear light source 100. Further, in FIG. 1, an optical axis direction of the imaging lens 7 will be referred to as an x-axis direction and a direction perpendicular to the x-axis direction will be referred to as a y-axis direction. Further, a direction perpendicular to the xy plane will be referred to as a z-axis direction. Additionally, the measurement object 9 is placed perpendicular to the x axis which is the optical axis of the displacement sensor 10 and the optical axis of the imaging lens 7.

The light source 1 is, for example, a laser beam source that emits a parallel light flux of one wavelength. As the light source 1, parallel light of a semiconductor laser obtained from a collimating lens or a gas laser of HeNe (helium neon) or the like may be used. The light source 1 may be a parallel light of a semiconductor laser with a collimating lens or a gas laser such as HeNe (helium neon) or the like. Further, an angle formed between the optical axis of the light source 1 and the x axis is 0°. In the description below, an example in which the light source 1 is a blue semiconductor laser having a wavelength of 450 nm will be described.

The first cylindrical lens 2 is a lens that has a curvature in the xy cross-section and is flat in the zx cross-section. The first cylindrical lens 2 linearly focuses the light emitted from the light source 1 in the z-axis direction. Further, an angle formed between the optical axis of the first cylindrical lens 2 and the x axis is 0°.

The second cylindrical lens 3 is a lens that has a curvature in the zx cross-section and is flat in the xy cross-section. The second cylindrical lens 3 linearly focuses the light transmitted through the first cylindrical lens 2 in the y-axis direction. Further, an angle formed between the optical axis of the second cylindrical lens 3 and the x axis is, for example, 14°. That is, as shown in FIG. 1, the second cylindrical lens 3 is provided on the xy plane with an inclination of a predetermined angle with respect to a perpendicular line of the x axis which is the optical axis of the imaging lens 7. The inclination angle is a value based on the length of the line sensor element 61 and the detected displacement.

In the slit 4, for example, a slit region 41 in which light is transmitted through a rectangular plate is formed in the y-axis direction. The slit region 41 is, for example, a rectangular opening having a dimension of 16 mm in the y-axis direction and a dimension of 0.02 mm in the z-axis direction. The slit 4 is, for example, one obtained by vapor-depositing a metal on glass or a thin metal plate of stainless steel or the like with a slit region 41 formed by etching. The light which is transmitted through the second cylindrical lens 3 to be concentrated is incident on the slit 4 and the light which is transmitted through the slit region 41 is incident on the beam splitter 5. Further, the light which is transmitted through the first cylindrical lens 2, the second cylindrical lens 3, and the slit region 41 becomes linear light as will be described later with reference to FIG. 3. Further, the slit 4 is also provided in parallel to the second cylindrical lens 3 and is provided with an inclination of a predetermined angle with respect to the x axis. An angle formed with respect to the x axis is, for example, 14°.

The linear light source 100 including the light source 1, the first cylindrical lens 2, the second cylindrical lens 3, and the slit 4 emits linear light in this way. Then, the linear light which is emitted from the linear light source 100 is incident on the imaging lens 7.

In the beam splitter 5, a reflection prevention film is formed on the side of the light source 1 and a half mirror film is formed on the side of the imaging lens 7. The beam splitter 5 allows the transmission of 50% of the incident light. That is, the beam splitter 5 shown in FIGS. 1 and 2 is a half mirror in which a ratio between the reflected light and the transmitted light is 1:1. The beam splitter 5 is provided on the xy plane with an inclination of 45° with respect to the x axis which is the optical axis of the imaging lens 7.

In the line sensor element 61 of the line sensor 6, for example, 2048 rectangular photo detector elements of 8×8 μm are arranged in a line. Further, a cover glass which protects the line sensor element 61 is provided for the line sensor 6. Further, the line sensor element 61 is formed so that an image formed in the line sensor 6 has a confocal relationship with an image 8 formed by the slit region 41 of the slit 4 over the entire area as will be described later. Further, the line sensor 6 is disposed so that the optical axis of the imaging lens 7 has an inclination of a predetermined angle with respect to the perpendicular line of the optical axis reflected by the beam splitter 5.

The imaging lens 7 is, for example, a double-side telecentric lens having a large numerical aperture NA and a magnification of 1.

The reference numeral 8 indicates an image obtained by the slit region 41 and is an image at an imaging position of the imaging lens 7. Since the slit 4 is provided at an inclination with respect to the optical axis of the imaging lens 7, the image 8 is also formed at an inclination with respect to the x axis which is the optical axis of the imaging lens 7. Further, each of the points 8a, 8b, and 8c is an example of the focus (imaging) position in the image 8.

The detection circuit 20 detects displacement of the measurement object 9 based on a result detected by the line sensor 6.

Figure 3:
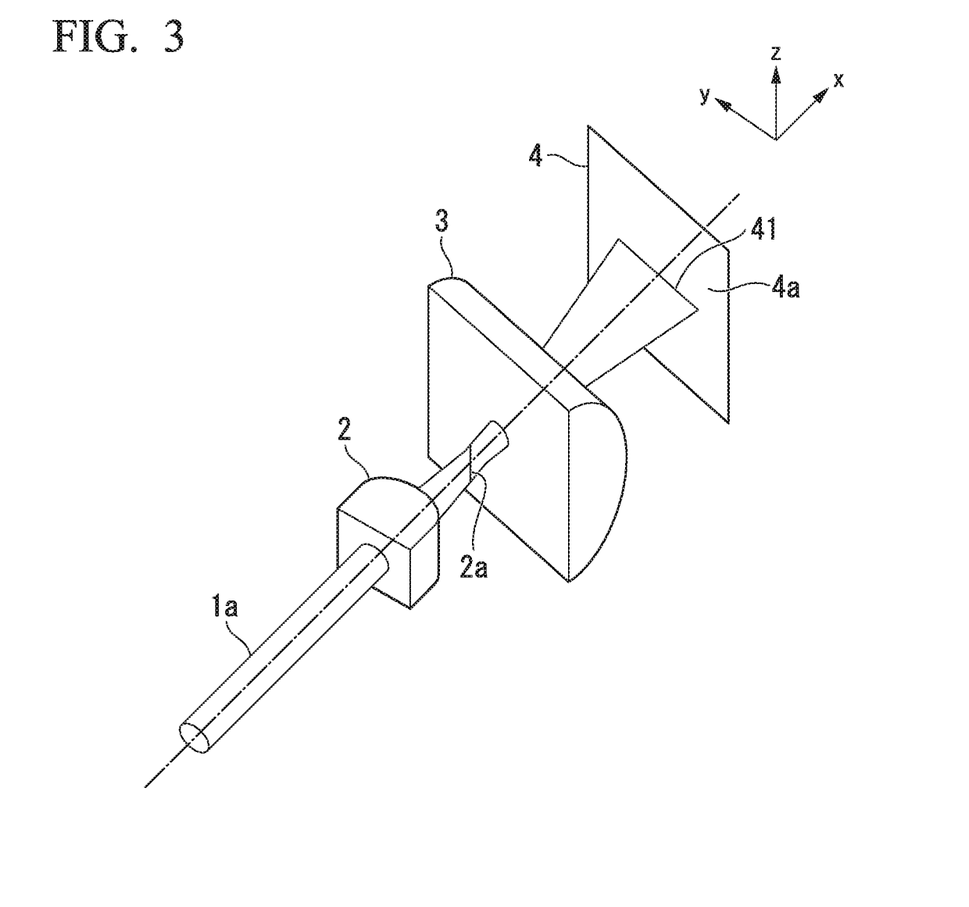
FIG. 3 is a perspective view showing configuration examples of a first cylindrical lens, a second cylindrical lens, and a slit according to the first embodiment.

FIG. 3 is a perspective showing configuration examples of the first cylindrical lens 2, the second cylindrical lens 3, and the slit 4 according to the embodiment.

In FIG. 3, the reference numeral 1a indicates a laser beam of parallel light emitted from the light source 1. The laser beam 1a is linearly concentrated in the z-axis direction by the first cylindrical lens 2 as indicated by the reference numeral 2a. Then, the light of the position 2a is linearly concentrated in the y-axis direction by the second cylindrical lens 3 and is concentrated on the slit region 41.

As shown in FIG. 3, the laser beam 1a which is emitted from the light source 1 is incident on the first cylindrical lens 2. Here, it is assumed that the wavelength of the light source 1 is 450 nm and the diameter of the laser beam 1a is 2 mm. Since the first cylindrical lens 2 has curvature in the xy plane, the light is concentrated on the xy plane. The focal position of the light concentrated by the first cylindrical lens 2 is the position 2a. Since the first cylindrical lens 2 does not have curvature in the zx plane, the width of the light flux does not change while the width in the z-axis direction is 2 mm.

In this case, the light at the position 2a concentrated by the first cylindrical lens 2 has a width of several tens of μm in the y-axis direction and a width of 2 mm in the z-axis direction. The width in the y-axis direction is a value which is set by the parallelism of the parallel light from the light source 1 and the curvature of the first cylindrical lens 2.

The light flux which spreads from the focal position 2a is incident on the second cylindrical lens 3. Here, an inclination of each of the second cylindrical lens 3 and the slit 4 with respect to the x axis is 14°. The inclination angle is an angle which can be detected by the line sensor element 61 having a length of 6 mm and a displacement of 4 mm (±2 mm) and corresponds to 14.036° (=$\tan^{-1}(4/16)$).

Since the second cylindrical lens 3 has curvature in the zx plane, the light is concentrated in the zx direction and the spread at the focal position 2a of the first cylindrical lens 2 is maintained.

The slit 4 is disposed at the focal position of the second cylindrical lens 3. Here, the slit region 41 is a rectangular opening having a dimension of 16 mm in the y-axis direction and a dimension of 0.02 mm in the z-axis direction. For this reason, most of the light beam which is incident from the second cylindrical lens 3 to the slit 4 can be transmitted through the slit region 41.

In this way, rectangular slit light of 16 mm×0.02 mm inclined with respect to the x axis which is the optical axis of the imaging lens 7 by 14° is formed.

Additionally, the above-described sizes are examples and the present invention is not limited thereto.

Referring to FIGS. 1 and 2, an operation of the optical system due to the light transmitted through the slit 4 will be described.

In the light which is transmitted through the slit 4, half is transmitted through the beam splitter 5 and half is reflected therefrom.

Since the reflection prevention film matching the wavelength of the light source 1 is formed on the side of the light source of the beam splitter 5, reflection from a surface on the side of the light source of the beam splitter 5 can be ignored. Additionally, it is desirable to provide a reflection prevention mechanism and a reflection prevention coating (not shown) at a position toward which the reflected light travels in order to prevent a problem in which the reflected light is reflected by other components (not shown) and is incident on the line sensor 6.

The light which is transmitted through the beam splitter 5 is incident on the imaging lens 7. Here, the imaging lens 7 forms the image 8 of the slit region 41 at an equal magnification in the vicinity of the measurement object 9. Additionally, the imaging lens is disposed so that the center of the slit 4 becomes an object side focus of the imaging lens 7 and the center of the image 8 becomes an image side focus of the imaging lens 7. Here, when an image on a surface (object surface) perpendicular to the x axis which is the optical axis of the imaging lens 7 is formed on a surface perpendicular to the x axis, this structure can be obtained by a normal lens (non-telecentric lens). However, in the case of the embodiment, since the slit 4 is inclined with respect to the x axis, a distance in the optical axis direction is different depending on the image height. As a result, in the optical system of the embodiment, it is necessary to consider the longitudinal magnification in addition to the lateral imaging magnification. In the normal lens (the non-telecentric lens), the lateral magnification is uniform and the longitudinal magnification is proportional to the square of the lateral magnification. For this reason, since the magnification changes due to a distance with respect to the lens when the normal lens is used as the imaging lens 7, the image 8 formed by the slit 4 does not have a linear shape. For this reason, in the embodiment, the double-side telecentric lens in which the lateral imaging magnification does not change due to a distance with respect to the lens is used as the imaging lens 7. Further, in the embodiment, the image forming magnification of the imaging lens 7 is set to an equal magnification (a magnification of 1).

The image 8 formed by the slit region 41 in this way is congruent with the slit region 41. Then, when the measurement object 9 is in the measurement range of the displacement sensor 10, intersection occurs at several positions of the image 8 (in FIG. 1, for example, the points 8a, 8b, and 8c). Additionally, a distance of the image 8 in the x-axis direction in the embodiment is ±2 mm.

In this way, in the embodiment, the imaging lens 7 forms an image of the linear light source at a position conjugate with the linear light source with an inclination of a predetermined angle with respect to the perpendicular line of the optical axis of the imaging lens 7. Here, the conjugation is an imaging relationship between the object forming the image and the image formed by the lens.

Next, the light which is focused and reflected by the measurement object 9 will be described with reference to FIG. 4.

Figure 4:
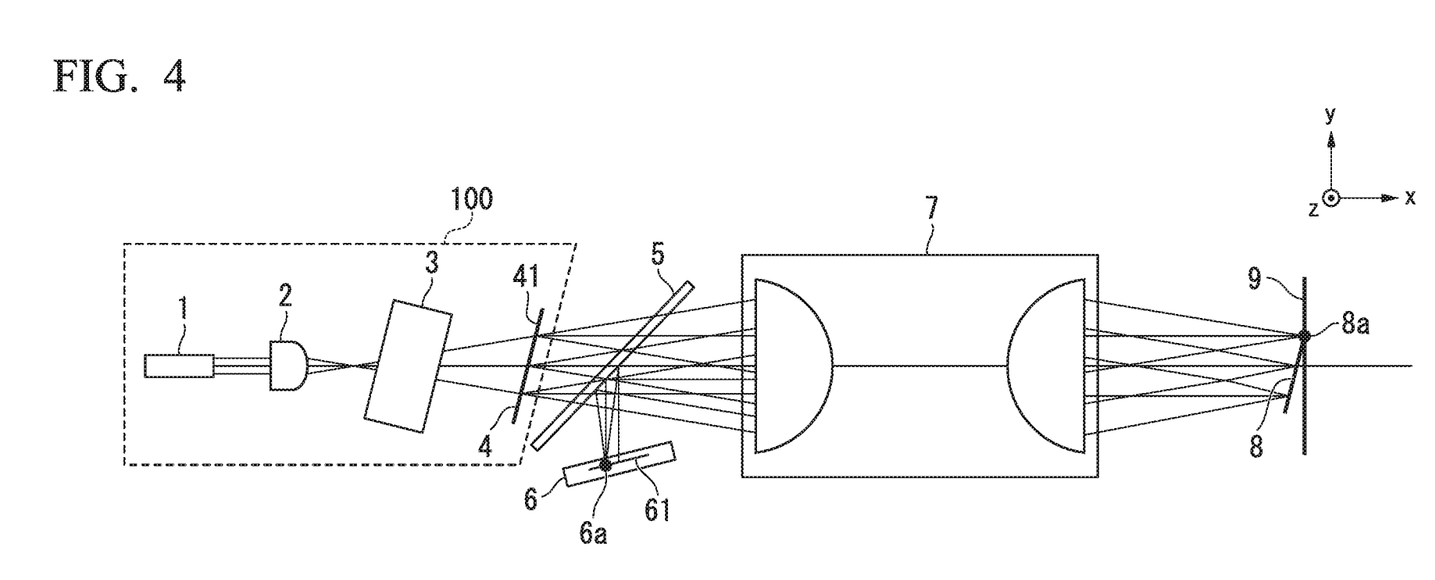
FIG. 4 is a diagram showing reflected light of FIG. 1.

FIG. 4 is a diagram showing the reflected light of FIG. 1. In the example shown in FIG. 4, an intersection point between the measurement object 9 and the image 8 is the point 8a.

At the point 8a, since the slit region 41 and the measurement object 9 are in a confocal relationship, strong reflection occurs. Meanwhile, since the focus of the image 8 does not match the measurement object 9 at other positions (for example the points 8*b* and 8*c*), the reflected light becomes weak.

As shown in FIG. 4, the reflected light from the measurement object 9 is transmitted through the imaging lens 7, is reflected by the beam splitter 5, and is incident on the line sensor 6. In this case, the image 8 and the line sensor element 61 have a confocal relationship and the point 8*a* of the image 8 and the point 6*a* of the line sensor element 61 have a confocal relationship. For this reason, the light which forms an image at the position of the point 8*a* of the image 8 forms an image at the position of the point 6*a* of the line sensor element 61. Since the focus is displaced at a position other than the point 8*a* of the image 8, the reflected light is weak. For this reason, the amount of the light incident on the line sensor element 61 is weaker than that of the point 6*a*.

In this way, in the embodiment, the line sensor 6 is disposed at a position conjugate with the image formed by the imaging lens 7 through the imaging lens 7 and the beam splitter 5 so that the optical axis of the imaging lens 7 has an inclination of a predetermined angle with respect to the perpendicular line of the optical axis reflected by the beam splitter 5.

The detection circuit 20 detects the amount of light received by each element of the line sensor element 61. In the embodiment, since the displacement of ±2 mm is detected by 2048 elements, one element corresponds to the displacement of about 2 μm. Although there is a large difference in light amounts among the confocal periphery position, the confocal position, and the non-confocal position due to the confocal relationship, the light slightly spreads to the periphery. For this reason, the detection circuit 20 can obtain the position of the reflected light with the resolution (a value corresponding to about ¹⁄₁₀ elements) of one element (sub-pixel) by obtaining the gravity center or the peak of the light amount. Additionally, the detection circuit 20 may obtain the gravity center or the peak after performing a clustering process on the light amount of the reflected light. Further, the detection circuit 20 may obtain the gravity center by dividing, for example, the sum of the products of the light receiving intensity and the position by the sum of the light receiving intensity using the light receiving intensity and the position.

Here, when the imaging lens 7 is not a complete double-side telecentric lens, the image 8 of the slit region 41 is not a completely linear line in some cases. In such a case, a correction plate is installed at the position of the measurement object 9 perpendicular to the x axis and a correspondence between the line sensor element 61 and a distance with respect to the imaging lens 7 is obtained in advance as a calibration curve while moving the distance by a necessary distance step. Then, this correspondence may be stored in the detection circuit 20. The detection circuit 20 can perform a measurement with a small error by correcting a detection value based on the stored correspondence between the line sensor element 61 and the distance.

Accordingly, according to the embodiment, since the measurement object 9 is placed on a plane perpendicular to the optical axis of the imaging lens 7, it is possible to realize a confocal displacement gauge capable of obtaining resolution and accuracy equivalent to that of a chromatic aberration type displacement sensor with a simple optical system without using an expensive chromatic aberration lens or spectroscope as in the prior art.

Additionally, the confocal system is an optical system in which light reflected from the surface of the measurement object 9 is received by the line sensor 6 corresponding to a detector and is an optical system which is designed such that illumination light radiated from the light source is focused on the surface of the measurement object 9 and the reflected light thereof is also focused on the detector.

First Modified Example of First Embodiment

Next, a case in which the measurement object 9 is not perpendicular to the x axis which is the optical axis of the imaging lens 7 will be described with reference to FIG. 5.

Figure 5:
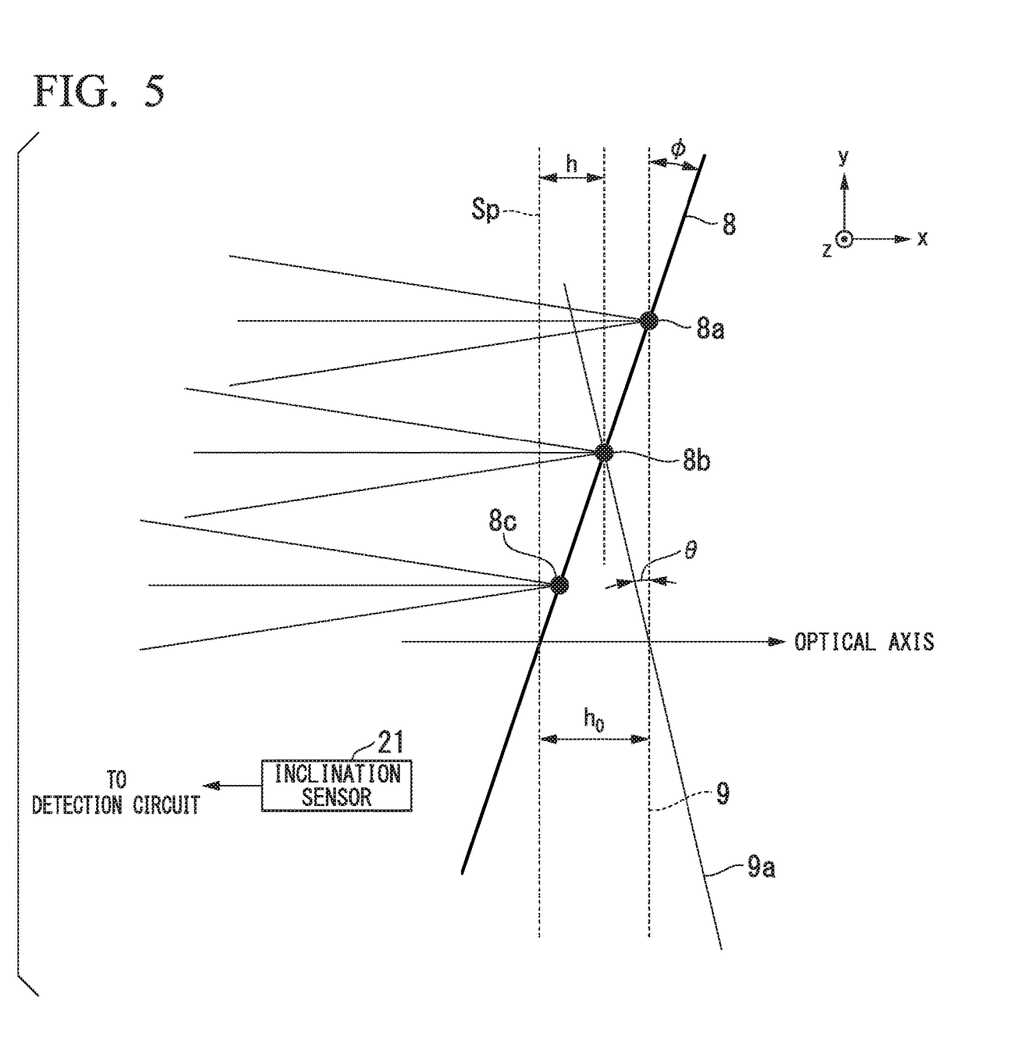
FIG. 5 is a diagram illustrating a case in which a measurement object according to the embodiment is not perpendicular to an x axis which is an optical axis of an imaging lens.

FIG. 5 is a diagram illustrating a case in which the measurement object 9 according to the embodiment is not perpendicular to the x axis which is the optical axis of the imaging lens 7. In the example shown in FIG. 5, the measurement object 9*a* is inclined with respect to the y axis by an angle θ. In FIG. 5, an angle φ indicates an inclination of the image 8 with respect to the y axis and is equal to the inclination of the slit 4, and is 14° here.

When the measurement object 9 is disposed perpendicular to the x axis, the image 8 and the measurement object 9 intersect each other at the point 8*a*. In this case, displacement between the measurement object 9 and a standard point Sp passing through the intersection point between the optical axis and the image 8 is ho.

Meanwhile, as shown in FIG. 5, since the measurement object 9*a* is inclined with respect to the y axis perpendicular to the x axis by an angle θ about the intersection point with the optical axis, the intersection point between the image 8 and the measurement object 9*a* becomes the position of the point 8*b*. In this case, the measured displacement between the standard point Sp and the measurement object 9*a* is h.

A relationship of the inclination θ and the displacements ho and h is expressed by the following equation (1).

$$h_0 = h\left(1 + \frac{\tan\theta}{\tan\phi}\right) \quad (1)$$

Here, when the inclination angle θ between the measurement object 9 and the optical axis of the displacement sensor 10 is measured by an inclination sensor 21, a correct displacement ho can be obtained based on the equation (1). In such a case, the detection circuit 20 stores the equation (1). Then, the detection circuit 20 obtains a correct displacement ho by correcting the measured displacement h using a measurement value obtained by the measurement of the inclination sensor 21.

Second Modified Example of First Embodiment

Figure 6:
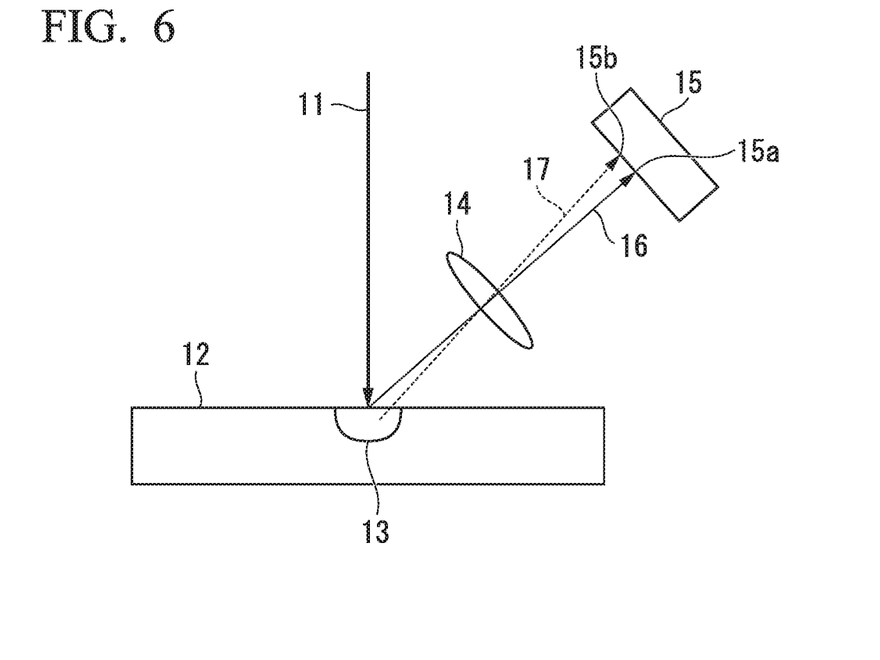
FIG. 6 is a diagram illustrating an example of an optical path of reflected light when penetration occurs.
Figure 7:
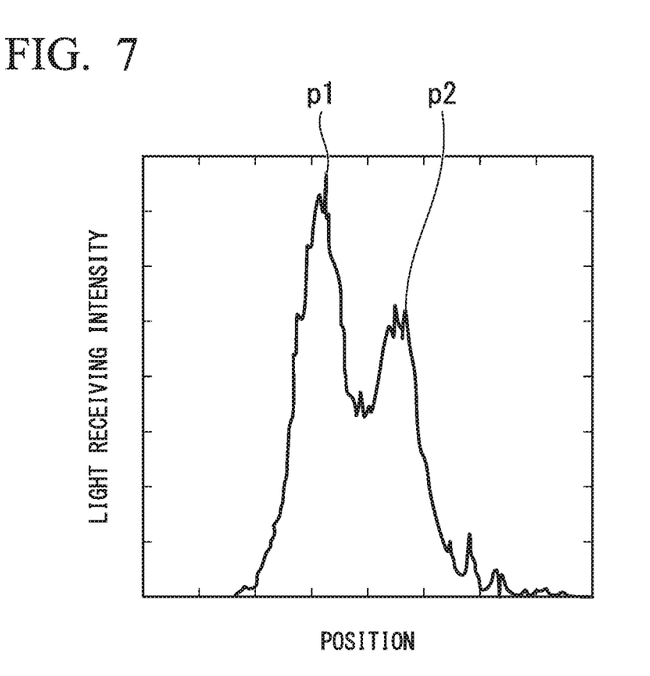
FIG. 7 is a diagram showing an example of a light amount when penetration occurs.

Next, when the surface of the measurement object 9 is fibrous like paper, a phenomenon called "penetration" occurs and hence an error may occur in the measurement result. Such a case will be described with reference to FIGS. 6 and 7. FIG. 6 is a diagram illustrating an example of an optical path of the reflected light when penetration occurs. Additionally, FIG. 6 is a diagram schematically showing an optical system of a triangulation type displacement sensor which radiates a light beam to the measurement object and measures a distance between the measurement object and the displacement sensor by measuring an angle of the reflected light from the measurement object using the line sensor. Further, FIG. 7 is a diagram showing an example of the light amount when the penetration occurs. In FIG. 7, a horizontal axis indicates a position inside the line sensor 6 and a vertical axis indicates a light receiving intensity.

In FIG. 6, the reference numeral 11 indicates a light beam after the light beam emitted from the light source is collimated as parallel light by a collimator lens (not shown). The reference numeral 12 indicates a measurement object, for example, paper. The reference numeral 13 indicates light generated by the penetration (hereinafter referred to as penetration light). The reference numeral 14 indicates a condensing lens. The reference numeral 15 indicates a line sensor. The reference numeral 16 indicates reflected light obtained when the light beam 11 emitted from the light source is reflected by the surface of the measurement object 12. The reference numeral 17 indicates reflected light caused by the penetration light reflected inside the measurement object 12.

When the light beam 11 is radiated to the measurement object 12, the light reflected from the surface of the measurement object 12 forms an image at the position of the point 15a of the line sensor 15 through the condensing lens 14. Since the measurement object 12 is paper, a part of the light beam 11 is diffused on the surface and enters the paper from clearance of fibers to become diffused light, that is, penetration light. The reflected light 17 of a part of the penetration light forms an image at the position of the point 15b different from the point 15a of the line sensor 15 through the condensing lens 14.

As a result, as shown in FIG. 7, a first maximal value of a light receiving intensity p1 due to the reflected light 16 from the surface of the measurement object 12 and a second maximal value of a light receiving intensity p2 due to the reflected light 17 caused by the penetration light are generated. Since the light receiving intensity p2 caused by the reflected light 17 due to the penetration light is different depending on the type, state, moisture content, ash content, presence of coating, and the like of the fibers constituting the paper, the reflected light 17 is not easily separated from the reflected light 16 on the surface. As a result, a measurement error may occur.

In order to prevent an influence caused by the penetration light, a method of sufficiently increasing the beam diameter of the light source 1 with respect to the fiber of the paper can be used, but in the second modified example of the embodiment, the influence caused by the penetration light is prevented by increasing the size of the image 8 due to the slit region 41.

Figure 8:
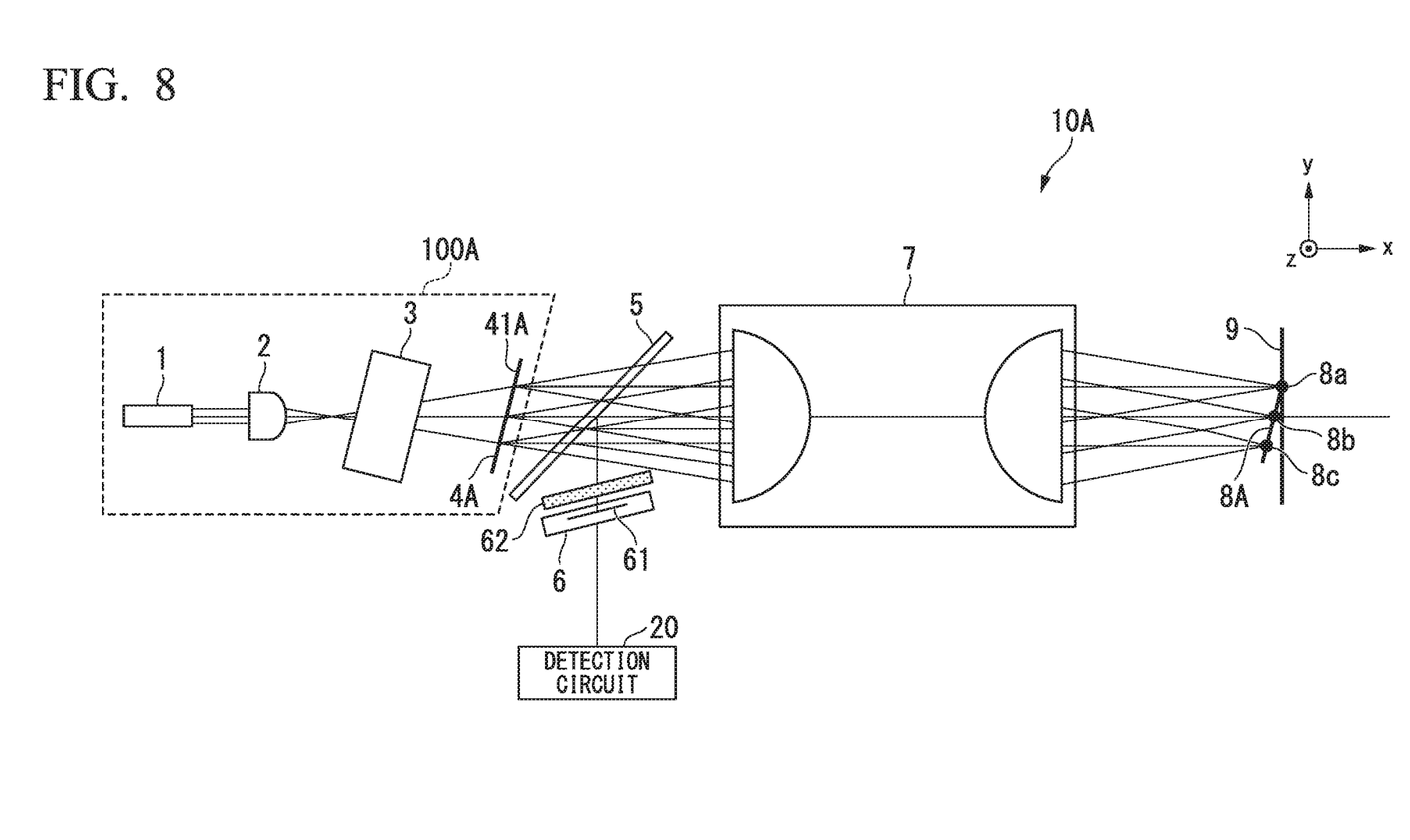
FIG. 8 is a diagram showing a configuration example of a displacement sensor according to a second modified example of the first embodiment and is a diagram as viewed from a + side of a z axis.

FIG. 8 is a diagram showing a configuration example of a displacement sensor 10A according to the second modified example of the first embodiment and is a diagram as viewed from the + side of the z axis.

Although a basic configuration of the displacement sensor 10A of the second modified example is the same as that of the displacement sensor 10 of FIG. 1, a third cylindrical lens 62 is further provided immediately before the line sensor 6 as shown in FIG. 8. Further, a slit region 41A of a slit 4A is formed in a rectangular shape having a width of about 16 mm in the y direction and a height of about 0.5 mm in the z direction. Then, the slit 4A is moved away from the focal position of the second cylindrical lens 3 to be disposed at a position in which the light flux size is slightly larger than the size of the slit region 41A.

Additionally, in the modified example of FIG. 8, the light source 1, the first cylindrical lens 2, the second cylindrical lens 3, and the slit 4A will be referred to as a linear light source 100A. Also in the modified example of FIG. 8, the linear light source 100A emits linear light. Then, the linear light emitted from the linear light source 100A is incident to the imaging lens 7. Further, also in the modified example of FIG. 8, the imaging lens 7 forms an image of the linear light source at a position conjugate with the linear light source with an inclination of a predetermined angle with respect to the perpendicular line of the optical axis of the imaging lens 7. Further, also in the modified example of FIG. 8, the line sensor 6 is disposed at a position conjugate with the image formed by the imaging lens 7 through the imaging lens 7 and the beam splitter 5 so that the optical axis of the imaging lens 7 has an inclination of a predetermined angle with respect to the perpendicular line of the optical axis reflected by the beam splitter 5.

The imaging lens 7 is disposed to form the image 8 by the slit region 41A. In the second modified example, an image 8A has a size of 16 mm×0.5 mm which is the same as that of the slit region 41A.

A reflection path due to the measurement object 9 is obtained as in FIG. 4. Here, when the third cylindrical lens 62 does not exist, the size of the image of the reflected light retuning to the line sensor element 61 is 16 mm×0.5 mm and is larger than the detection range of the line sensor element 61. Here, the detection range of the line sensor element 61 is 16 mm×0.008 mm.

For this reason, in the second modified example, the third cylindrical lens 62 is provided immediately before the line sensor 6 in parallel to the line sensor 6. Then, the third cylindrical lens 62 is disposed so that the focus of the third cylindrical lens 62 matches the detection range of the line sensor element 61. Accordingly, since the light flux in which the height of the reflected light is 0.5 mm is focused and is incident as the size of 0.008 mm, the light flux can be measured by the line sensor element 61 in which a detection range in the height direction is 0.008 mm.

That is, in the second modified example, since the slit region 41A is formed to be large in order to prevent the influence caused by the penetration light, the size of the image 8A due to the slit region 41A is set to be larger than that of the displacement sensor 10. Further, in the second modified example, the third cylindrical lens 62 is provided immediately before the line sensor 6. Accordingly, according to the second modified example, an influence caused by the penetration light can be prevented even when the measurement object is paper or the like and hence the measurement object can be measured with high accuracy.

Additionally, in the embodiment, an example in which the laser beam source is used as the light source 1 has been described, but the present invention is not limited thereto. The light source 1 may be, for example, a high pressure mercury lamp, an incandescent lamp, a light emitting diode, or the like.

When these are used as the light source 1, the present invention is not limited to the first cylindrical lens 2 and the second cylindrical lens 3 and an optical system according to the type of the light source 1 may be used. In this case, a light source and an optical system capable of setting the luminance of the slit region 41A to be a uniform luminance as much as possible may be used.

Further, an example in which the light source 1 is a point light source has been described, but the present invention is not limited thereto. The light source 1 may be, for example, a surface emitting diode or a semiconductor laser in which a radiation region is linear. In this case, two cylindrical lenses or the slit 4 may be an optical system that matches the light source.

Further, in the embodiment, an example has been described in which the beam splitter 5 corresponding to the half mirror is used to separate the illumination light and the reflected light, but the present invention is not limited thereto. Instead of the half mirror, a polarization beam splitter may be used as the beam splitter 5. In this case, since the light is made incident from the light source 1 as P-polarized light, it is desirable to dispose a quarter-wave plate between the polarization beam splitter and the measurement object 9 at an angle of 45° with respect to the polarization direction of the light transmitted from the polarization beam splitter. With such a configuration, since most of the light flux is irradiated from the light source 1 to the measurement object 9, the light amount reflected by the polarization beam splitter can be decreased and hence stray light is simply processed. As a result, since the light reflected from the measurement object 9 is substantially focused to the line sensor 6, it is possible to improve the light utilization efficiency and the S/N ratio. Additionally, when the measurement object 9 is a member that influences polarized light, it is desirable to use the half mirror for the beam splitter 5 instead of the polarization beam splitter.

Further, in the embodiment, an example has been described in which a double-side telecentric lens having an equal magnification is used as the imaging lens 7, but the present invention is not limited thereto. A non-telecentric lens, a non-equal magnification lens, or the like may be used as the imaging lens 7. In this case, since the slit image in the vicinity of the measurement object 9 is not linear but bent, a relationship between the position of the line sensor 6 and the displacement is not linear.

For this reason, a relationship between the line sensor and the displacement may be stored in the detection circuit 20 in advance and the displacement measured by the detection circuit 20 may be corrected.

Further, in the embodiment, an example has been described in which the line sensor 6 is used as the detector for detecting the displacement, but the present invention is not limited thereto. Instead of the line sensor 6, for example, a CCD (Charge Coupled Device) image sensor or a C-MOS (Complementary MOS) image sensor may be used. When the CCD image sensor or the C-MOS image sensor is used, since a position adjustment system is relaxed for the line sensor 6 having a width of 10 µm or less, there is an effect that an adjustment process can be simplified.

Second Embodiment

In the embodiment, an example of further improving the contrast of the line sensor 6 in the displacement sensor 10 will be described.

Figure 9:
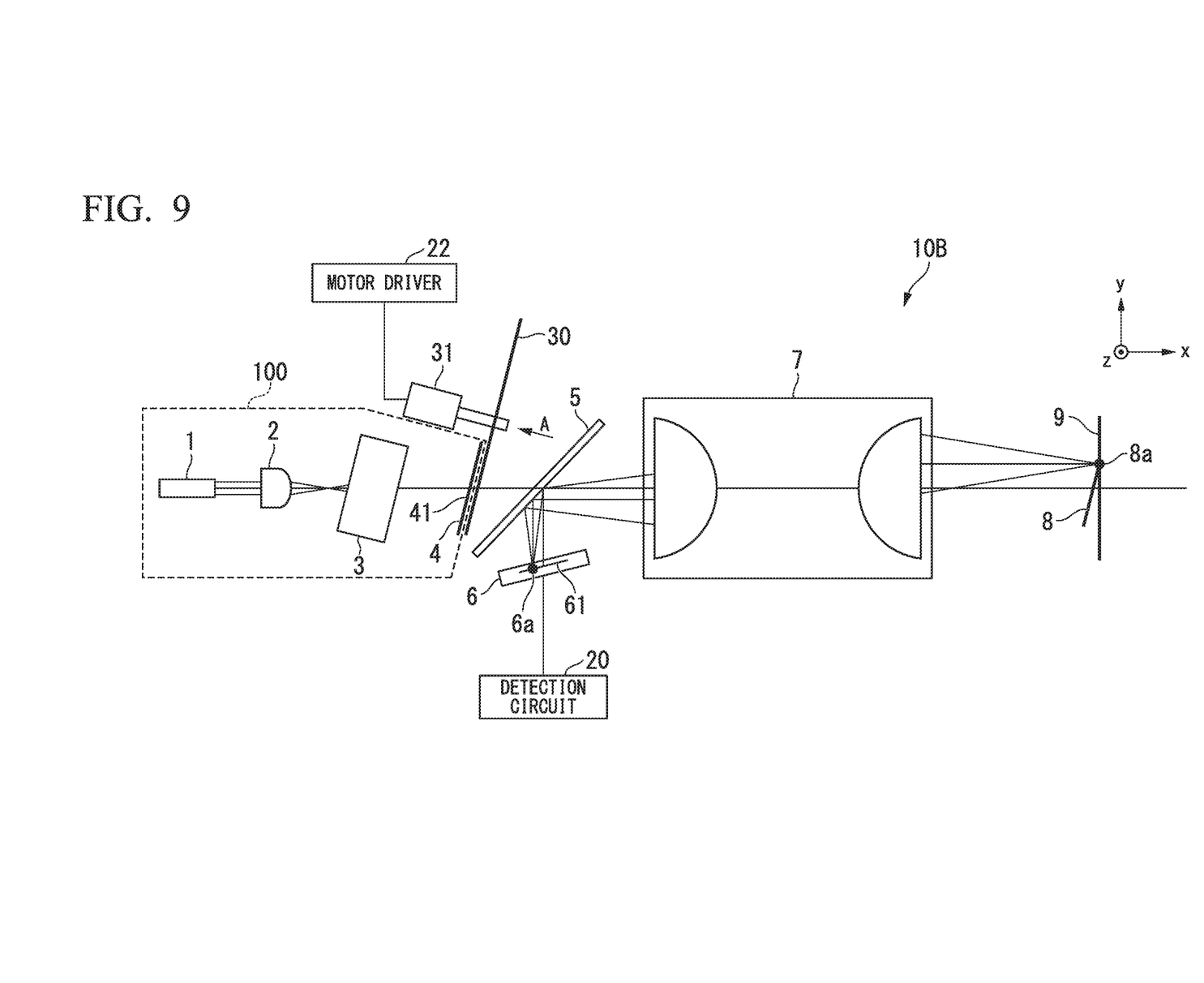
FIG. 9 is a diagram showing a configuration example of a displacement sensor according to a second embodiment and is a diagram as viewed from a + side of a z axis.

FIG. 9 is a diagram showing a configuration example of a displacement sensor 10B according to the embodiment and is a diagram as viewed from the + side of the z axis. As shown in FIG. 9, the displacement sensor 10B includes the light source 1, the first cylindrical lens 2, the second cylindrical lens 3, the slit 4, the beam splitter 5, the line sensor 6, the imaging lens 7, the detection circuit 20, a slit wheel 30, a motor 31, and a motor driver 22. Further, the line sensor 6 includes a line sensor element 61. Additionally, the same reference numerals will be given to the same function parts as those of the displacement sensor 10 of the first embodiment and a description thereof will be omitted.

As shown in FIG. 9, in the displacement sensor 10B, the slit wheel 30 is provided between the slit 4 and the beam splitter 5 in parallel to the slit 4.

The slit wheel 30 includes a plurality of spiral slits and is rotated by the motor 31. The slit wheel 30 is formed by, for example, vapor-depositing metal or the like not allowing the transmission of light on an optical glass and includes a plurality of spiral slits which are formed by etching or the like so that light is transmitted therethrough. The slit wheel 30 is attached to a rotation shaft of the motor 31. An angle formed between the slit wheel 30 and the x axis is, for example, 14°. Additionally, a structure example of the slit wheel 30 will be described with reference to FIG. 10.

Additionally, in the embodiment, the light source 1, the first cylindrical lens 2, the second cylindrical lens 3, and the slit 4 will be referred to as the linear light source 100. Additionally, the linear light source 100 may include the slit wheel 30. Also in the embodiment, the linear light source 100 emits linear light. Then, the linear light emitted from the linear light source 100 is incident to the imaging lens 7. Further, also in the embodiment, the imaging lens 7 forms an image of the linear light source at a position conjugate with the linear light source while having an inclination of a predetermined angle with respect to the perpendicular line of the optical axis of the imaging lens 7. Further, also in the embodiment, the line sensor 6 is disposed at a position conjugate with the image formed by the imaging lens 7 through the imaging lens 7 and the beam splitter 5 so that the optical axis of the imaging lens 7 has an inclination of a predetermined angle with respect to the perpendicular line of the optical axis reflected by the beam splitter 5.

The motor driver 22 rotates the motor 31 at a predetermined rotation speed at the time of measuring the displacement.

The motor 31 is rotated by the motor driver 22.

Additionally, the motor 31 may include an encoder that detects a rotation of the motor 31. In this case, the detection circuit 20 may generate a pulse corresponding to a ¼ rotation based on a detection result detected by the encoder and may expose the line sensor 6 based on the pulse.

Figure 10:
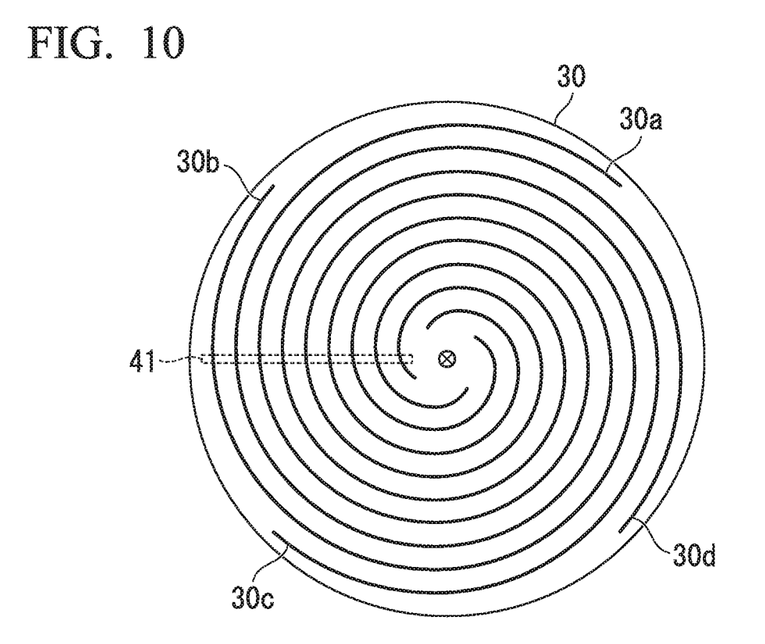
FIG. 10 is a diagram showing a configuration example of a slit wheel according to the second embodiment.

Next, a configuration example of the slit wheel 30 will be described.

FIG. 10 is a diagram showing a configuration example of the slit wheel 30 according to the embodiment. The slit wheel 30 in the example shown in FIG. 10 is provided with four spiral slits 30a, 30b, 30c, and 30d through which light is transmitted.

The slit width of each of the spiral slits 30a, 30b, 30c, and 30d is substantially the same as the width of the opening of the slit region 41 of the slit 4. An interval of the spiral slits 30a, 30b, 30c, and 30d is set to, for example, ¹⁄₁₀ of the length of the opening of the slit region 41.

When the slit wheel 30 rotates in a counter-clockwise direction by ¼(90°), the spiral is formed to move from the right to the left in the longitudinal direction of the opening of the slit region 41 by ¹⁄₁₀ of the length of the opening of the slit region 41.

Further, since four spiral slits 30a, 30b, 30c, and 30d are targeted four times, the spiral slits are formed so that the spiral slit 30a overlaps a position where the spiral slit 30b was present, the spiral slit 30b overlaps a position where the spiral slit 30c was present, the spiral slit 30c overlaps a position where the spiral slit 30d was present, and the spiral slit 30d overlaps a position where the spiral slit 30a was present whenever the spiral slits rotate by 90°. Further, four spiral slits 30a, 30b, 30c, and 30d are formed to reach the outermost periphery from the innermost periphery by 2.5 rotations.

In FIG. 10, a rectangle formed by a chain line indicates the slit region 41 of the displacement sensor 10B. In this way, minute openings are formed at ten positions at the same interval in the longitudinal direction of the opening of the slit region 41 at the corresponding positions of the slit region 41.

Here, when viewed from the direction of the arrow A of FIG. 9, a portion in which the opening of the slit region 41 overlaps the openings of the spiral slits 30a, 30b, 30c, and 30d becomes a substantially square minute opening. When the motor 31 rotates at a constant speed by the motor driver 22, it appears that the minute openings formed at ten positions at the same interval along the longitudinal direction of the opening of the slit region 41 continuously move while keeping a gap from the right side to the left side.

The time required for sweeping the length of 1/10 of the opening of the slit region 41 by ten minute openings is the same as the time in which the slit wheel 30 rotates by ¼. For this reason, it is desirable that the exposure time of the line sensor 6 be integer times the time. Accordingly, since the exposure time is the same even when the minute opening is present at any position, it is possible to prevent a change in luminance due to a position. As a result, according to the embodiment, since it is possible to suppress the cross-talk from a position other than the focus, the measurement can be performed with large contrast as compared with the displacement sensor 10 of the first embodiment.

Accordingly, similarly to the displacement sensor 10 of the first embodiment, according to the embodiment, since the measurement object 9 is placed on a plane perpendicular to the optical axis of the imaging lens 7, there is no need to use an expensive chromatic aberration lens or spectroscope as in the related art. As a result, it is possible to realize a confocal displacement gauge having the same resolution and accuracy as those of the chromatic aberration type displacement sensor with a simple optical system.

Additionally, in FIG. 9, a configuration example is shown in which the slit wheel 30, the motor 31, and the motor driver 22 are provided in the configuration of FIG. 1, but the present invention is not limited thereto. Also in the configuration of the first modified example of the first embodiment or the second modified example of the first embodiment (FIG. 8), the slit wheel 30, the motor 31, and the motor driver 22 may be provided.

Additionally, in the embodiment, a method of sweeping the plurality of minute openings by the rotation of the slit 4 and the slit wheel 30 which are in a fixed state has been described, but the present invention is not limited thereto. For example, a configuration may be employed in which a plurality of chips such as LEDs or O-LEDs (organic LEDs) are mounted on the opening portion of the slit region 41 of the slit 4 to sweep the LED lighting timing. In this case, for example, the detection circuit 20 may control the LED lighting timing.

Additionally, also in the second embodiment, the light source 1 of the displacement sensor 10B may be a laser beam source, a high pressure mercury lamp, an incandescent lamp, a light emitting diode, or the like similarly to the first embodiment. When the high pressure mercury lamp, the incandescent lamp, the light emitting diode, or the like is used in the light source 1, the present invention is not limited to the first cylindrical lens 2 and the second cylindrical lens 3 and an optical system according to the type of the light source 1 may be used. In this case, a light source and an optical system capable of setting the luminance of the slit region 41 to be a uniform luminance as much as possible may be used. Further, the light source 1 may be, for example, a surface emitting diode or a semiconductor laser in which a radiation region is linear. In this case, two cylindrical lenses or the slit 4 may be an optical system that matches the light source.

Further, also in the second embodiment, a polarization beam splitter may be used as the beam splitter 5 instead of the half mirror. In this case, since the light is made incident from the light source 1 as P-polarized light, it is desirable to dispose a quarter-wave plate between the polarization beam splitter and the measurement object 9 at an angle of 45° with respect to the polarization direction of the light transmitted from the polarization beam splitter.

Further, also in the second embodiment, a non-telecentric lens, a non-equal magnification lens, or the like can be used as the imaging lens 7.

Further, also in the second embodiment, for example, a CCD image sensor or a C-MOS image sensor may be used as the detector for detecting the displacement instead of the line sensor 6.

Additionally, a program for realizing a part or all of the functions of the detection circuit 20 of the present invention may be stored in a computer readable storage medium and the program stored in the storage medium may be read and executed by the computer system to execute a part or all of the processes performed by the detection circuit 20. Additionally, the "computer system" mentioned herein includes OS or hardware such as peripheral devices. Further, the "computer system" also includes a WWW system having a homepage providing environment (or display environment).

Further, the "computer readable storage medium" means a storage device including a portable medium such as a flexible disk, a magneto-optical disk, a ROM, and a CD-ROM or a hard disk built in the computer system. Furthermore, the "computer readable storage medium" also includes a medium that stores a program for a predetermined time as in a volatile memory (RAM) inside the computer system which becomes a server or a client when the program is transmitted via a communication network such as an internet or a communication line such as a phone line.

Further, the program may be transmitted from a computer system storing the program in a storage device or the like to other computer systems via a transmission medium or a transmission wave in the transmission medium. Here, the "transmission medium" that transmits the program means a medium having an information transmission function as in a communication network such as an internet or a communication line such as a phone line. Further, the program may be used to realize a part of the above-described functions. Furthermore, the function may be realized by the combination of the program stored in the computer system in advance, that is, a so-called difference file (difference program).

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A displacement sensor which detects displacement of a measurement object, comprising:
   a linear light source which emits a linear beam;
   a beam splitter;
   a line sensor; and
   an imaging lens,
   wherein the linear light source is disposed with an inclination of a predetermined angle with respect to a perpendicular line of an optical axis of the imaging lens,
   wherein the imaging lens forms an image of the linear light source at a position conjugate with the linear light source with an inclination of a predetermined angle with respect to the perpendicular line of the optical axis of the imaging lens,
   wherein the beam splitter is disposed between the linear light source and the imaging lens,
   wherein the line sensor is disposed at a position conjugate with the image formed by the imaging lens through the imaging lens and the beam splitter so that the optical axis of the imaging lens has the inclination of the predetermined angle with respect to the perpendicular line of the optical axis reflected by the beam splitter, and
   wherein the displacement sensor further comprises:
      an inclination sensor configured to detect an inclination between the measurement object and the optical axis of the imaging lens corresponding to the optical axis of the displacement sensor; and
      a detection circuit configured to correct a displacement measured by the displacement sensor based on the inclination detected by the inclination sensor.

2. The displacement sensor according to claim 1,
   wherein the linear light source further comprises:
      a laser;
      a first cylindrical lens which is disposed between the laser and the beam splitter to be perpendicular to the optical axis of the imaging lens;
      a second cylindrical lens which is disposed between the first cylindrical lens and the beam splitter with the inclination of the predetermined angle with respect to the perpendicular line of the optical axis of the imaging lens; and
      a slit which is disposed between the second cylindrical lens and the beam splitter with the inclination of the predetermined angle with respect to the perpendicular line of the optical axis of the imaging lens and parallel to the beam splitter, and
   wherein a light beam emitted from the laser forms parallel light through the first cylindrical lens and the second cylindrical lens and is transmitted through the slit to form the linear light.

3. The displacement sensor according to claim 2,
   wherein an x-axis direction is an optical axis direction of the imaging lens, a y-axis direction is a direction perpendicular to the x-axis direction, and a z-axis direction is a direction perpendicular to an xy plane, and
   wherein the first cylindrical lens is a lens that has a curvature in an xy cross-section and is flat in a zx cross-section.

4. The displacement sensor according to claim 3,
   wherein the first cylindrical lens linearly focuses the light emitted from the laser in the z-axis direction.

5. The displacement sensor according to claim 3,
   wherein an angle formed between an optical axis of the first cylindrical lens and the x axis is 0°.

6. The displacement sensor according to claim 3,
   wherein the slit is provided in parallel to the second cylindrical lens and is provided with an inclination of a predetermined angle with respect to the x axis.

7. The displacement sensor according to claim 2,
   wherein an x-axis direction is an optical axis direction of the imaging lens, a y-axis direction is a direction perpendicular to the x-axis direction, and a z-axis direction is a direction perpendicular to an xy plane, and
   wherein the second cylindrical lens is a lens that has a curvature in a zx cross-section and is flat in an xy cross-section.

8. The displacement sensor according to claim 7,
   wherein the second cylindrical lens linearly focuses the light transmitted through the first cylindrical lens in the y-axis direction.

9. The displacement sensor according to claim 7,
   wherein the second cylindrical lens is provided on the xy plane with an inclination of a predetermined angle with respect to a perpendicular line of the x axis which is an optical axis of the imaging lens.

10. The displacement sensor according to claim 2,
    wherein in the beam splitter, a reflection prevention film is formed on a side of the laser and a half mirror film is formed on a side of the imaging lens.

11. The displacement sensor according to claim 2,
    wherein the beam splitter is a polarization beam splitter.

12. The displacement sensor according to claim 1, further comprising:
    a third cylindrical lens which is disposed between the beam splitter and the line sensor,
    wherein the third cylindrical lens is disposed in parallel to the line sensor and at a front surface of the line sensor.

13. The displacement sensor according to claim 1, further comprising:
    a slit wheel in which a plurality of slits is provided immediately behind the linear light source and is disposed with the inclination of the predetermined angle with respect to the perpendicular line of the optical axis of the imaging lens; and
    a motor which rotates the slit wheel,
    wherein the line sensor is configured to measure displacement of the measurement object based on reflected light due to the rotation of the slit wheel.

14. The displacement sensor according to claim 13,
    wherein the slits formed in the slit wheel are spiral slits.

15. The displacement sensor according to claim 14,
    wherein a slit width of each of the spiral slits is substantially the same as a width of an opening of a slit region of the slit.

16. The displacement sensor according to claim 15,
    wherein a portion in which the opening of the slit region overlaps an opening of each of the spiral slits is a substantially square.

17. The displacement sensor according to claim 1,
    wherein the imaging lens is a double-side telecentric lens having a magnification of 1.

18. The displacement sensor according to claim 1, wherein the imaging lens is a non-telecentric lens or a non-equal magnification lens.

19. A displacement sensor which detects displacement of a measurement object, comprising:
- a linear light source which emits a linear beam;
- a beam splitter;
- a line sensor; and
- an imaging lens, wherein the linear light source is disposed with an inclination of a predetermined angle with respect to a perpendicular line of an optical axis of the imaging lens, wherein the imaging lens forms an image of the linear light source at a position conjugate with the linear light source with an inclination of a predetermined angle with respect to the perpendicular line of the optical axis of the imaging lens, wherein the beam splitter is disposed between the linear light source and the imaging lens, wherein the line sensor is disposed at a position conjugate with the image formed by the imaging lens through the imaging lens and the beam splitter so that the optical axis of the imaging lens has the inclination of the predetermined angle with respect to the perpendicular line of the optical axis reflected by the beam splitter, wherein the linear light source further comprises:
- a laser;
- a first cylindrical lens which is disposed between the laser and the beam splitter to be perpendicular to the optical axis of the imaging lens;
- a second cylindrical lens which is disposed between the first cylindrical lens and the beam splitter with the inclination of the predetermined angle with respect to the perpendicular line of the optical axis of the imaging lens; and
- a slit which is disposed between the second cylindrical lens and the beam splitter with the inclination of the predetermined angle with respect to the perpendicular line of the optical axis of the imaging lens and parallel to the beam splitter, wherein a light beam emitted from the laser forms parallel light through the first cylindrical lens and the second cylindrical lens and is transmitted through the slit to form the linear light, and wherein the imaging lens is disposed so that a center of the slit becomes an object side focus of the imaging lens and a center of the image becomes an image side focus of the imaging lens.

* * * * *